United States Patent
Al Majid et al.

(10) Patent No.: US 12,184,988 B2
(45) Date of Patent: *Dec. 31, 2024

(54) ADAPTIVE FRONT FLASH VIEW

(71) Applicant: Snap Inc., Santa Monica, CA (US)

(72) Inventors: Newar Husam Al Majid, New York, NY (US); Christine Barron, Los Angeles, CA (US); Ryan Chan, Los Angeles, CA (US); Bertrand Saint-Preux, Hollywood, FL (US); Shoshana Sternstein, Great Neck, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,155

(22) Filed: Jun. 13, 2023

(65) Prior Publication Data

US 2023/0328390 A1    Oct. 12, 2023

Related U.S. Application Data

(63) Continuation of application No. 17/363,581, filed on Jun. 30, 2021, now Pat. No. 11,683,592.

(51) Int. Cl.
*H04N 23/74* (2023.01)
*H04N 23/611* (2023.01)
(Continued)

(52) U.S. Cl.
CPC ........... *H04N 23/74* (2023.01); *H04N 23/611* (2023.01); *H04N 23/62* (2023.01); *H04N 23/73* (2023.01)

(58) Field of Classification Search
CPC ...... H04N 23/74; H04N 23/611; H04N 23/62; H04N 23/73
See application file for complete search history.

(56) References Cited

U.S. PATENT DOCUMENTS 9,609,230 B1   3/2017   Bakshi et al.
9,635,255 B1   4/2017   Baldwin
(Continued)

FOREIGN PATENT DOCUMENTS

CN   106303278 A   1/2017
CN   108377336 A   8/2018
(Continued)

OTHER PUBLICATIONS

"15 Snapchat Tricks and Hidden Features that You Need to Try Today", [Online]. Retrieved from the Internet: <URL:https://web.archive.org/web/20180228025703/https://techwithlove.com/cool-snapchat-tricks-and-hidden-features/>, (Jul. 26, 2016), 12 pgs.

(Continued)

*Primary Examiner* — Ahmed A Berhan
(74) *Attorney, Agent, or Firm* — Schwegman Lundberg & Woessner, P.A.

(57) ABSTRACT

The technical problem of enhancing the quality of an image captured in low light conditions by a front facing camera is addressed by providing an adaptive front flash system. An adaptive front flash system automatically adjusts configuration parameters of an overlaid view that operates in lieu of a front flash, termed a front flash view. The configuration parameters are adjusted based on characteristics of the output of the digital image sensor of the front facing camera. Examples of configuration parameters of the front flash view include one or more of brightness of the display, color temperature of the front flash view, and transparency of the front flash view.

20 Claims, 12 Drawing Sheets

(51) Int. Cl.
*H04N 23/62* (2023.01)
*H04N 23/73* (2023.01)

(56) References Cited

U.S. PATENT DOCUMENTS

| | | | |
|---|---|---|---|
| 10,277,829 B1 | 4/2019 | Garrido et al. | |
| 11,683,592 B2 | 6/2023 | Al Majid et al. | |
| 11,722,779 B2 | 8/2023 | Al Majid et al. | |
| 2006/0098112 A1* | 5/2006 | Kelly | H04N 23/64 348/333.12 |
| 2015/0201130 A1 | 7/2015 | Cho et al. | |
| 2016/0028965 A1* | 1/2016 | Horii | H04N 23/63 348/333.01 |
| 2016/0098138 A1* | 4/2016 | Park | G06F 3/04886 345/173 |
| 2017/0236337 A1 | 8/2017 | Devries | |
| 2018/0181794 A1* | 6/2018 | Benini | G06V 40/18 |
| 2018/0204599 A1 | 7/2018 | Garrett et al. | |
| 2019/0188454 A1 | 6/2019 | Yuan et al. | |
| 2020/0022859 A1 | 1/2020 | Werkheiser | |
| 2020/0228539 A1 | 7/2020 | Bonar et al. | |
| 2021/0105389 A1 | 4/2021 | Ko et al. | |
| 2021/0118404 A1 | 4/2021 | Bartscherer et al. | |
| 2022/0262326 A1 | 8/2022 | Sommerlade et al. | |
| 2022/0408006 A1 | 12/2022 | Al Majid et al. | |
| 2023/0007159 A1 | 1/2023 | Al Majid et al. | |
| 2023/0232115 A1 | 7/2023 | Al Majid et al. | |

FOREIGN PATENT DOCUMENTS

| | | |
|---|---|---|
| CN | 111246121 A | 6/2020 |
| CN | 117561719 | 2/2024 |
| CN | 117616771 | 2/2024 |
| EP | 2897351 A2 | 7/2015 |
| WO | WO-2022272270 A1 | 12/2022 |
| WO | WO-2023279060 A1 | 1/2023 |

OTHER PUBLICATIONS

"U.S. Appl. No. 17/354,817, Non Final Office Action mailed Jul. 21, 2022", 13 pgs.

"U.S. Appl. No. 17/354,817, Notice of Allowance mailed Nov. 17, 2022", 8 pgs.

"U.S. Appl. No. 17/354,817, Response filed Oct. 21, 2022 to Non Final Office Action mailed Jul. 21, 2022", 10 pgs.

"U.S. Appl. No. 17/363,581, Final Office Action mailed Nov. 18, 2022", 7 pgs.

"U.S. Appl. No. 17/363,581, Non Final Office Action mailed Jun. 22, 2022", 14 pgs.

"U.S. Appl. No. 17/363,581, Notice of Allowance mailed Feb. 8, 2023", 10 pgs.

"U.S. Appl. No. 17/363,581, Response filed Jan. 18, 2023 to Final Office Action mailed Nov. 18, 2022", 10 pgs.

"U.S. Appl. No. 17/363,581, Response filed Sep. 22, 2022 to Non Final Office Action mailed Jun. 22, 2022", 12 pgs.

"How do you get low light mode on Snapchat?", [Online]. Retrieved from the Internet: <URL:https://www.youtube.com/watch?v=9KVmx_v7RWI>, (Feb. 23, 2021), 1-4.

"International Application Serial No. PCT/US2022/073096, International Search Report mailed Oct. 11, 2022", 5 pgs.

"International Application Serial No. PCT/US2022/073096, Written Opinion mailed Oct. 11, 2022", 7 pgs.

"International Application Serial No. PCT/US2022/073306, International Search Report mailed Oct. 12, 2022", 5 pgs.

"International Application Serial No. PCT/US2022/073306, Written Opinion mailed Oct. 12, 2022", 6 pgs.

"U.S. Appl. No. 17/354,817, Corrected Notice of Allowability mailed Feb. 22, 2023", 2 pgs.

"U.S. Appl. No. 17/354,817, Notice of Allowance mailed Mar. 30, 2023", 8 pgs.

"International Application Serial No. PCT/US2022/073306, Response to Written Opinion and Article 34 Amendments filed Apr. 28, 2023", 27 pgs.

"International Application Serial No. PCT/US2022/073306, Written Opinion mailed May 26, 2023", 4 pgs.

"International Application Serial No. PCT/US2022/073306, International Preliminary Report on Patentability mailed Aug. 24, 2023", 8 pgs.

"International Application Serial No. PCT/US2022/073096, International Preliminary Report on Patentability mailed Jan. 4, 2024", 9 pgs.

"U.S. Appl. No. 18/123,651, Non Final Office Action mailed Feb. 28, 2024", 14 pgs.

"U.S. Appl. No. 18/123,651, Response filed Jun. 12, 2024 to Non Final Office Action mailed Feb. 28, 2024", 8 pgs.

"International Application Serial No. PCT/US2024/010517, International Search Report mailed Apr. 9, 2024", 3 pgs.

"International Application Serial No. PCT/US2024/010517, Written Opinion mailed Apr. 9, 2024", 7 pgs.

U.S. Appl. No. 17/354,817 U.S. Pat. No. 11,722,779, filed Jun. 22, 2021, Viewfinder Ring Flash.

U.S. Appl. No. 18/123,651, filed Mar. 20, 2023, Viewfinder Ring Flash.

U.S. Appl. No. 17/363,581 U.S. Pat. No. 11,683,592, filed Jun. 30, 2021, Adaptive Front Flash View.

U.S. Appl. No. 18/405,849, filed Jan. 5, 2024, Context-Aware Lighting System.

* cited by examiner

ADAPTIVE FRONT FLASH VIEW

CROSS-REFERENCE TO RELATED APPLICATIONS

This application is a continuation of prior application Ser. No. 17/363,581, filed on Jun. 30, 2021, which is incorporated by reference herein in its entirety.

TECHNICAL FIELD

The present disclosure relates generally to creating and manipulating digital content.

BACKGROUND

The popularity of computer-implemented programs that permit users to access and interact with content and other users online continues to grow. Various computer-implemented applications exist that permit users to share content with other users through messaging clients. Some of such computer-implemented applications, termed apps, can be designed to run on a mobile device such as a phone, a tablet, or a wearable device, while having a backend service provided on a server computer system to perform operations that may require resources greater than is reasonable to perform at a client device (for example, storing large amounts of data or performing computationally expensive processing). The input/output I/O components of a client device often include one or more cameras (with still image/photograph and video capabilities) including a front camera (also referred to as a front facing camera) on a front surface of the client device and a rear camera on a rear surface of the client device. An application executing at a client device may provide a user interface (UI) that allows a user to capture a photo of themselves (termed, informally, a selfie) using a front facing camera of the client device, and to share the captured image to other devices. Users often take selfies in low light during the night time or early morning, which may produce images that are not shared with others or even discarded.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings in which.

DETAILED DESCRIPTION

Embodiments of the present disclosure improve the functionality of electronic software and systems by enhancing users' experience of utilizing a camera of a client device. As mentioned above, taking photos in low light may produce images that may be deemed by a user as not worth saving or sharing with others. A rear camera can be used with a flash device, e.g., a light emitting diode (LED) flash that uses a semiconductor device to illuminate a scene. A front facing camera is often provided at a mobile device without a flash device. In order to compensate, at least to a degree, for the lack of a flash device, a mobile device may execute a front flash camera application that can illuminate the scene, the user's face for example, by displaying an overlaid view and increasing the brightness of the display of the associated client device, also referred to as the screen brightness.

Figure 7:
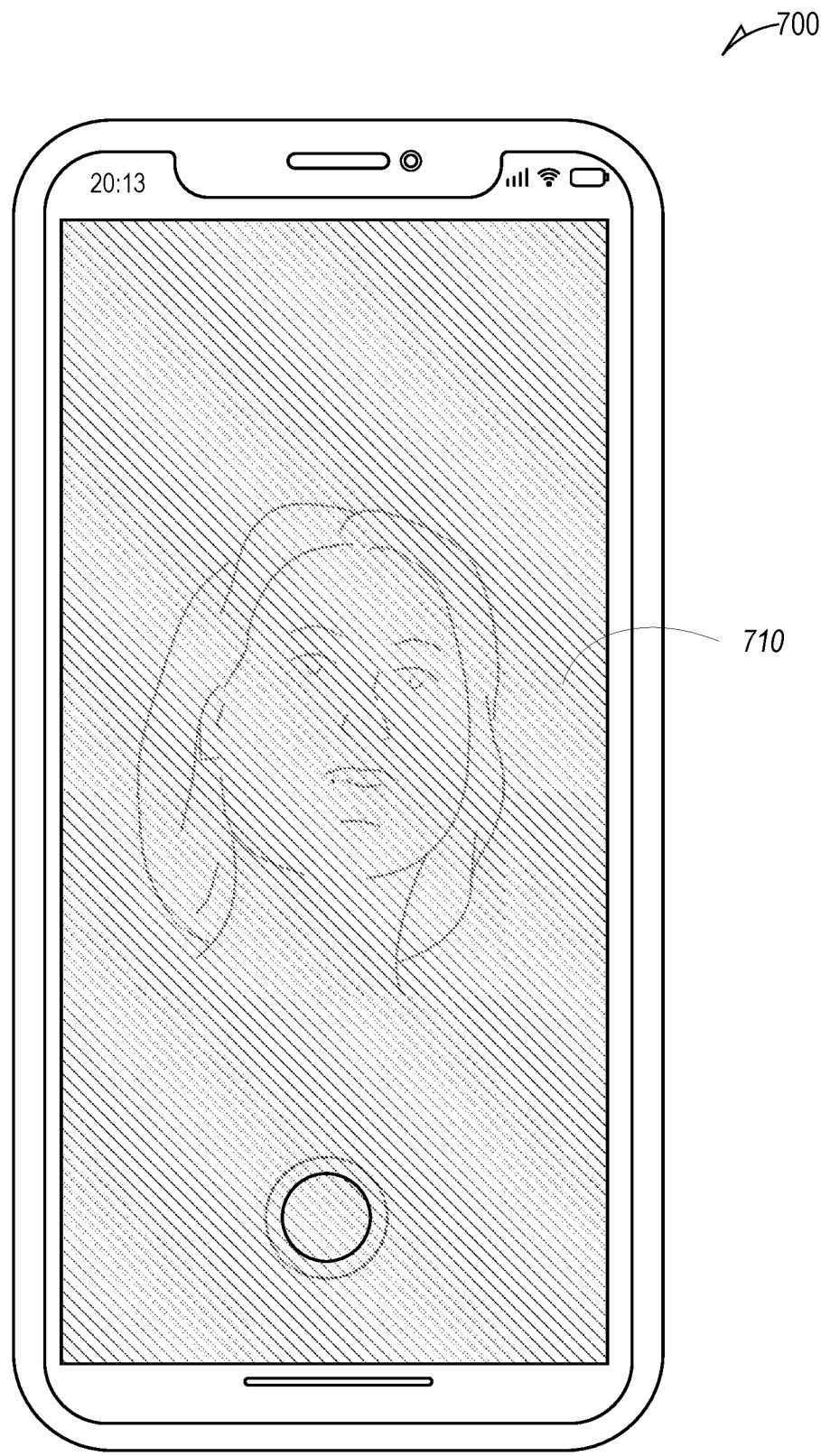
FIG. 7 illustrates a front flash view, in accordance with some examples.

The technical problem of enhancing the quality of an image captured in low light conditions by a front facing camera, which may be provided without a hardware flash device such as a LED flash, is addressed by automatically adjusting configuration parameters of an overlaid view that operates in lieu of a front flash in that it provides increased illumination of a scene being detected by a digital image sensor of the front facing camera. For the purposes of this description, an overlaid view that operates in lieu of a front flash is referred to as a front flash view. A front flash view that can be adapted to make the scene appear in the best light by automatically adjusting the configuration parameters of the front flash view based on characteristics of the output of the digital image sensor of the front facing camera is referred to as an adaptive front flash view, for the purposes of this description. An example of a front flash view is shown in FIG. 7, which illustrates a camera view UI 700. For the purposes of this description, a camera view UI is a UI that displays the output of the digital image sensor of a camera and that may also display various user selectable elements, such as, for example, a user selectable element actionable to capture the output of the digital image sensor of the camera, that can be activated by touching the area of the screen that displays the user selectable element. In FIG. 7, the camera view UI 700 is shown with the adaptive front flash view activated, and the output of the digital image sensor of the camera is overlaid by a front flash view, which is shown in area 710 with a diagonal lines pattern.

Figure 8:
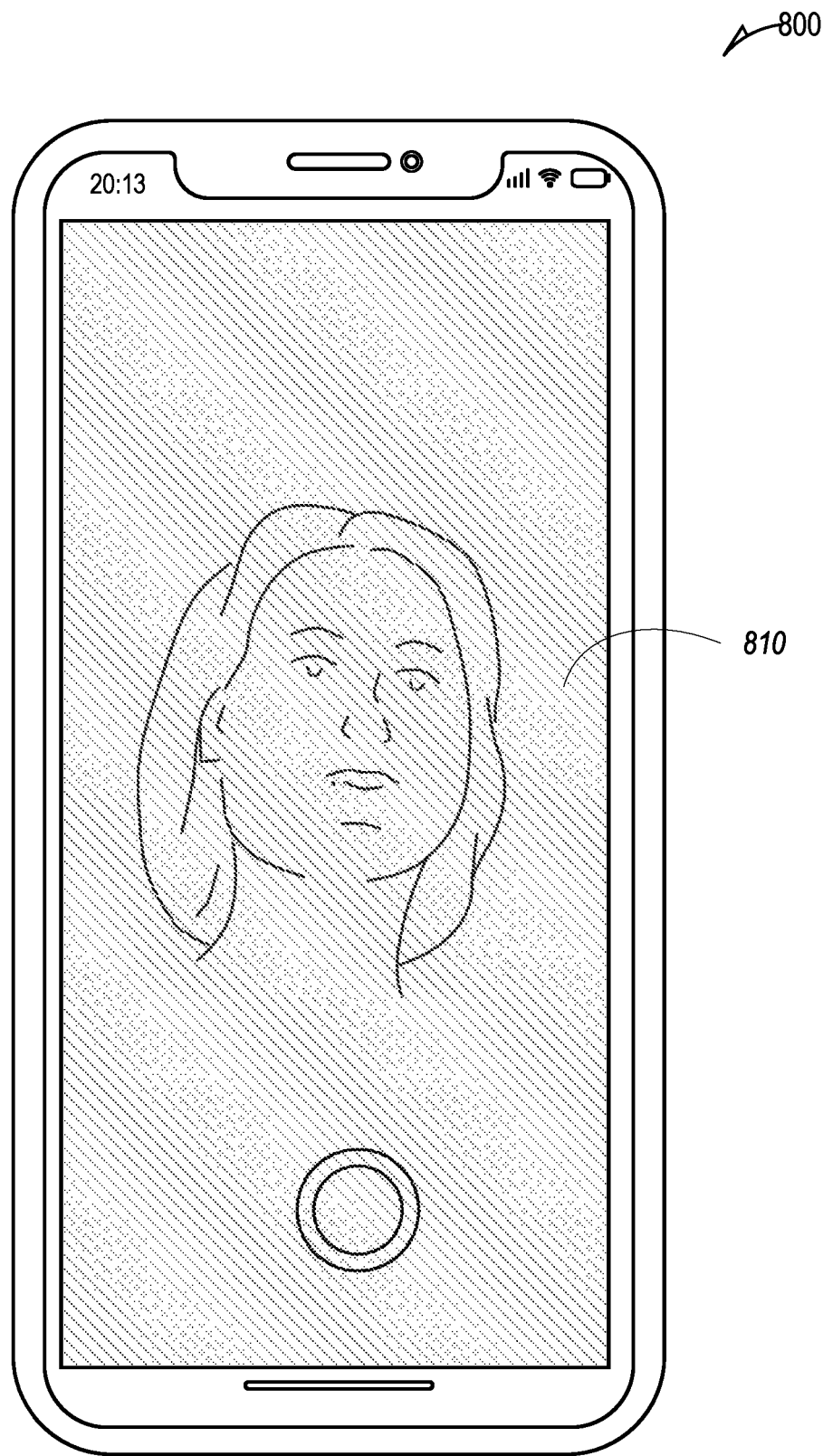
FIG. 8 illustrates a front flash view with configuration parameters adjusted by increasing transparency of the front flash view, in accordance with some examples.

Examples of configuration parameters of the front flash view include brightness of the screen, color temperature of the front flash view, transparency of the front flash view, and other parameters. Transparency of the front flash view controls the intensity of the illumination of the subject, where lower transparency of the front flash view results in greater illumination of the subject. For example, in FIG. 7 the transparency of the front flash view is high, which results in the output of the digital image sensor of the camera—a face shown in the area 710—being barely visible. FIG. 8 illustrates a camera view UI 800, in which the adaptive front flash view has greater transparency, in which case the output of the digital image sensor of the camera is more visible in area 810, as compared to a face shown in the are 710 of FIG. 7, while the output of the digital image sensor of the camera is overlaid by the front flash view.

Figure 9:
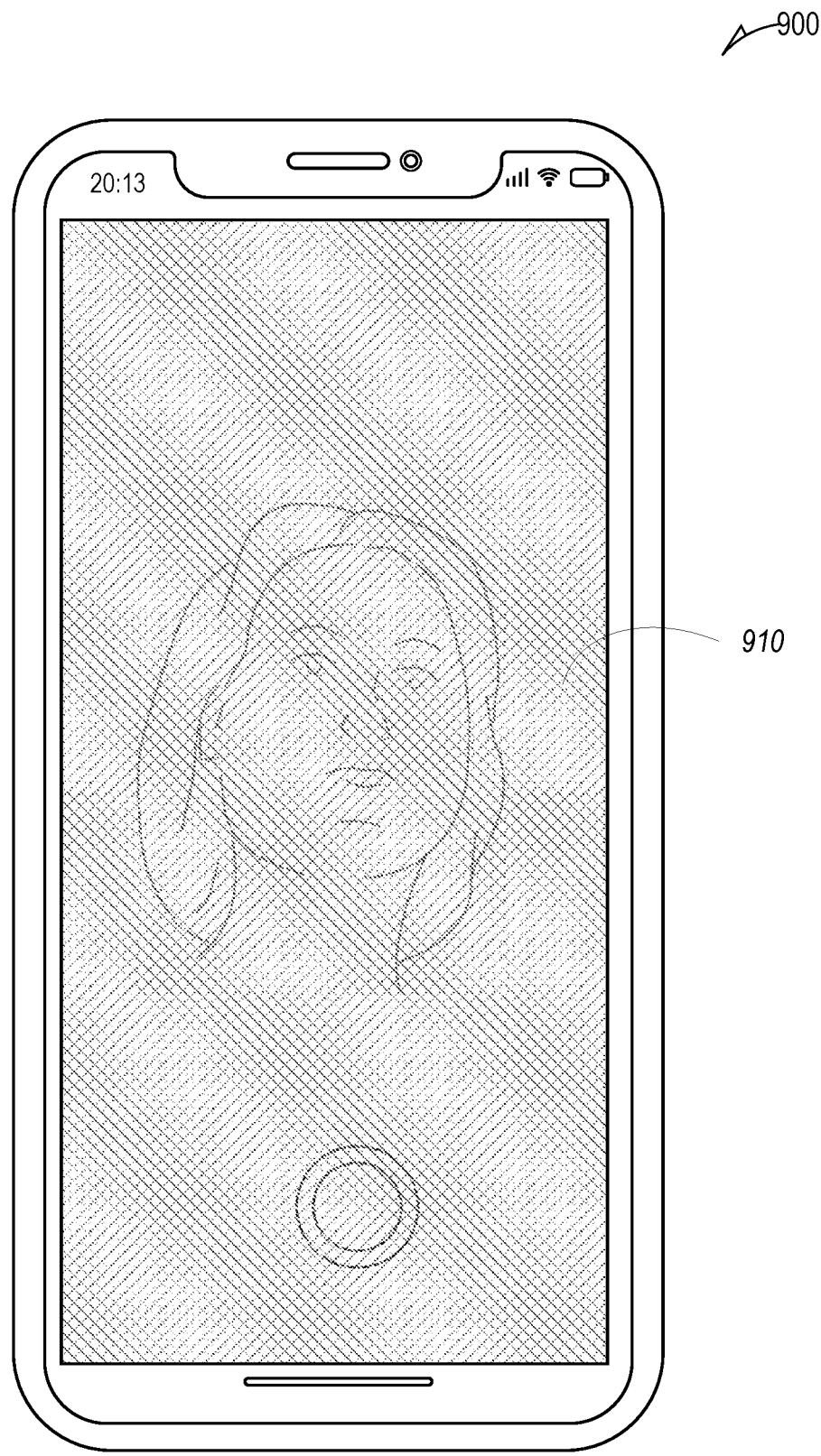
FIG. 9 illustrates a front flash view with configuration parameters adjusted by changing the color warmth of the front flash view, in accordance with some examples.

Color temperature is a way to describe the light appearance provided by a light source. For example, cool colors are more bluish, while warm colors are more yellowish. In FIG. 9, the overlaid front flash view is shown in the area 910 with a crossing diagonal lines pattern to indicate a different color warmth of the front flash view as compared to the color warmth of the front flash view shown in FIG. 7 and FIG. 8.

The characteristics of the output of the digital image sensor of the front facing camera that are used to automatically adjust the configuration parameters of the front flash view include the histogram of the image corresponding to the output of the digital image sensor of the front facing camera, which indicates the number of pixels of each brightness value in the image. In an image where dark tones dominate, the histogram is skewed to the left, indicating that the image is underexposed. Underexposure occurs when not enough light is hitting the camera sensor. Underexposed images appear too dark. In an image where light tones dominate, the histogram is skewed to the right. Overexposure occurs when not enough light is hitting the camera sensor. Overexposed images appear too light. Another example of the characteristics of the output of the digital image sensor of the front facing camera that are used to automatically adjust the configuration parameters of the front flash view is a set of respective values, assigned to pixels, that represent respective colors.

To automatically adjust the configuration parameters of the front flash view, the characteristics of the output of the digital image sensor of the front facing camera that can be used as follows. For example, if the histogram of the image corresponding to the output of the digital image sensor of the front facing camera indicates underexposure, the configuration parameters of the front flash view can be adjusted by increasing the brightness of the screen and/or decreasing transparency of the front flash view. The degree to which the brightness of the screen is increased and the degree to which the transparency of the front flash view is decreased, as well as whether one or both of these configuration parameters are adjusted, may be made dependent on the degree of the detected underexposure. In another example, if the histogram of the image corresponding to the output of the digital image sensor of the front facing camera indicates overexposure, the configuration parameters of the front flash view can be adjusted by decreasing the brightness of the screen and/or increasing transparency of the front flash view. The degree to which the brightness of the screen is decreased and the degree to which the transparency of the front flash view is increased, as well as whether one or both of these configuration parameters are adjusted, may be made dependent on the degree of the detected overexposure.

A system configured to provide an adaptive front flash view may be referred to as an adaptive front flash system. In some examples, the adaptive front flash system is configured to detect a person's face in the image that corresponds to the output of the digital image sensor and adjust the configuration parameters of the front flash view based on the characteristics of the portion of the image that represents the detected face. The adaptive front flash system may request a permission from a user to detect a face and proceed to detect a face only after obtaining the permission.

In some examples, the adaptive front flash system uses characteristics of the output of the digital image sensor of the front facing camera to automatically adjust the configuration parameters of the front flash view by determining the color tone of the detected face based on respective values of pixels of the image corresponding to the face portion of the output of the digital image sensor of the front facing camera. The respective values of pixels of the face may indicate predominance of a blue color tone in the face, which may result from the face being illuminated by a computer screen, for example. In response to detecting predominance of a blue color tone in the face, the adaptive front flash system increases the color temperature of the front flash view to make it more yellow or orange. In response to detecting predominance of a yellow color tone in the face, which may result from having a navy blue wallpaper in the background, for example, the adaptive front flash system decreases the color temperature of the front flash view to make it less yellow or to make it white or even light blue.

An adaptive front flash view, in some examples, is a view, which is displayed as overlaid over a camera view UI at the same time as when a user selectable element actionable to capture the output of the digital image sensor of the camera is activated. As mentioned above, in this example, the front flash view may have the brightness and transparency that results in obscuring the output of the digital image sensor of the camera in the camera view UI. A front flash view that is displayed as overlaid substantially over the entire area of the camera view UI, including the central area of the camera view UI, when a user selectable element actionable to capture the output of the digital image sensor of the camera is activated, is referred to as a blanket front flash view.

Figure 10:
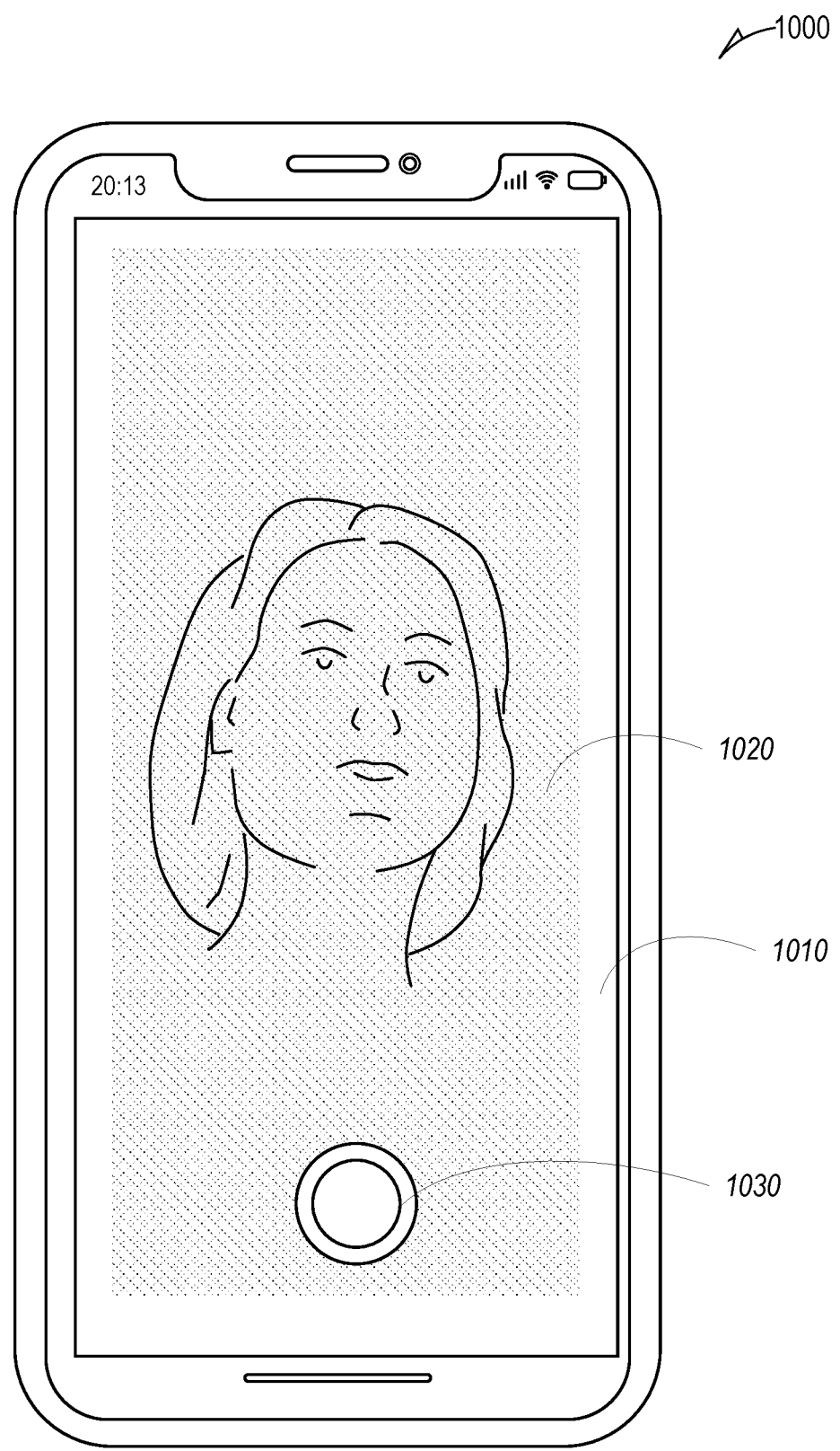
FIG. 10 illustrates a camera view user interface that includes a ring flash view, in accordance with some examples.

An example of an adaptive front flash view is an illuminating border added to the camera view UI. The illuminating border that acts as a ring flash for the front facing camera is termed a ring flash view for the purposes of this description. A ring flash view can be provided in the form of a predetermined area along the perimeter of the camera view UI, as can be seen in FIG. 10, which is described in more detail further below. In some examples, a ring flash view is constructed as a single view overlaid over the camera view UI that displays the output of the digital image sensor of a camera, where such view is transparent (and therefore allows a user to see the output of the digital image sensor) except for in the certain area along the perimeter of the camera view UI. In another example, a ring flash view is constructed as several views, such as one for each side of the camera view UI, where each view is overlaid over a respective area along the perimeter of the camera view UI. A ring flash view may be automatically generated and presented in the camera view UI when the digital sensor of a front facing camera detects a low light indication based on intensity of incident light detected by the digital image sensor of the camera. While a blanket front flash view is displayed when a user selectable element actionable to capture the output of the digital image sensor of the camera is activated, a ring flash view is displayed and is viewable by a user before a user selectable element actionable to capture the output of the digital image sensor of the camera is activated, such that the output of the digital image sensor of the camera reflects the additional illumination provided by the ring flash view.

Figure 1:
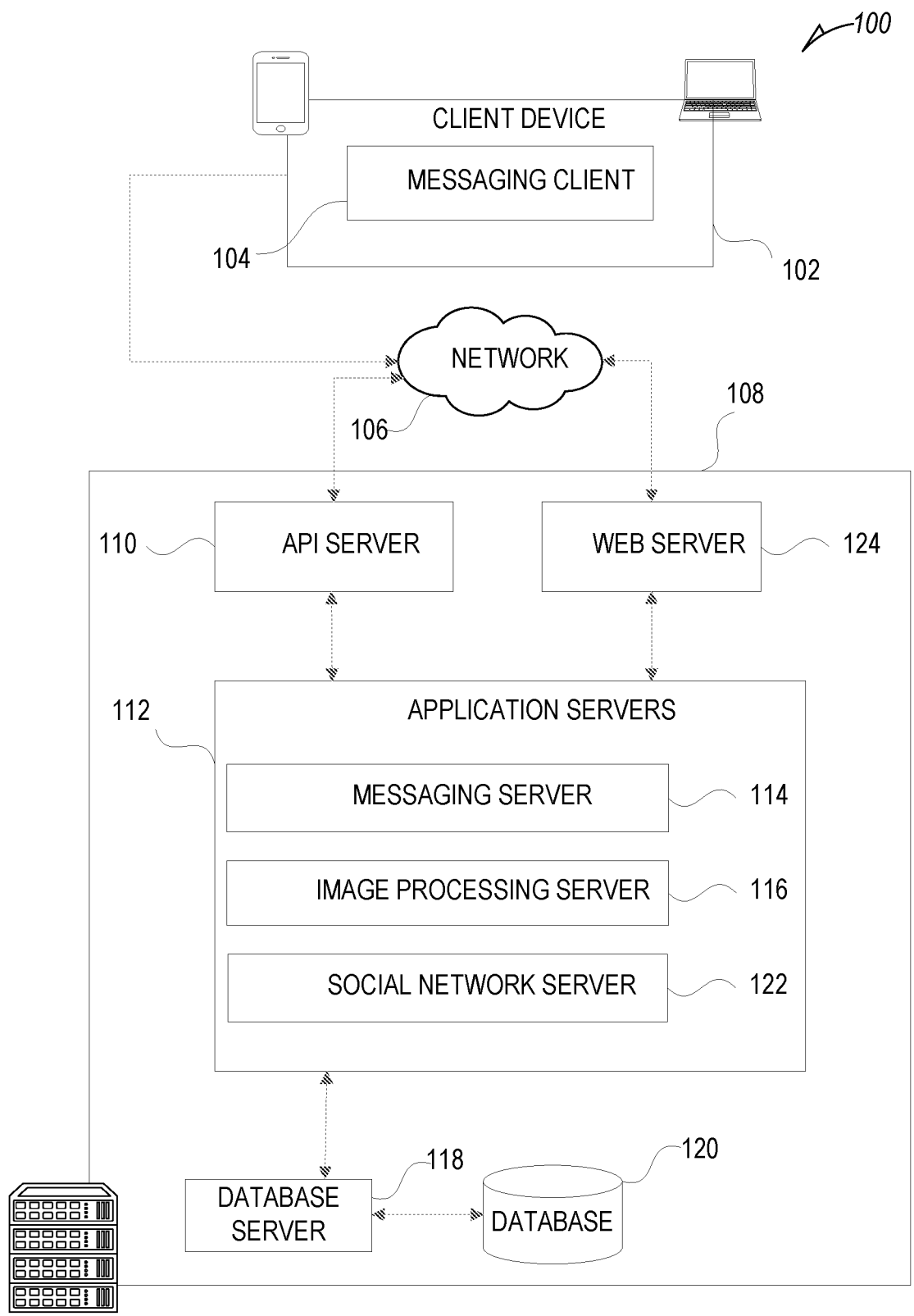
FIG. 1 is a diagrammatic representation of a networked environment in which an adaptive front flash system may be deployed, in accordance with some examples.

In some examples, an adaptive front flash view is used in the context of a messaging system that hosts a backend service for an associated messaging client. A messaging system is described further below with reference to FIG. 1-5. While the adaptive front flash view is described below in the context of a messaging system, the methodologies described herein can be used advantageously in various computer implemented applications that permit the use of a camera of the associated client device Networked Computing Environment FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging client 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include, as examples, message content, client device information, geolocation information, media augmentation and overlays, message content persistence conditions, social network information, live event information, as well as images and video captured with a front facing camera of an associated client device using an adaptive front flash view. Data exchanges within the messaging system 100 are invoked and controlled through functions available via user interfaces (UIs) of the messaging client 104. The messaging client 104 presents a camera view UI that displays the output of a digital image sensor of a camera provided with the client device 102, and, also, displays various user selectable elements that can be activated by touching the area of the screen that displays the user selectable element. The messaging client 104, in some examples, includes an adaptive front flash view system that automatically adjusts configuration parameters of a front flash view based on characteristics of the output of the digital image sensor of the front facing camera. The messaging client 104 provides functionality permitting a user to communicate, to another client device, an image captured while the front flash view is displayed with the adjusted configuration parameters as an overlay in the camera view UI.

Turning now specifically to the messaging server system 108, an Application Program Interface (API) server 110 is coupled to, and provides a programmatic interface to, application servers 112. The application servers 112 are communicatively coupled to a database server 118, which facilitates access to a database 120 that stores data associated with messages processed by the application servers 112. Similarly, a web server 124 is coupled to the application servers 112, and provides web-based interfaces to the application servers 112. To this end, the web server 124 processes incoming network requests over the Hypertext Transfer Protocol (HTTP) and several other related protocols.

The Application Program Interface (API) server 110 receives and transmits message data (e.g., commands and message payloads) between the client device 102 and the application servers 112. Specifically, the Application Program Interface (API) server 110 provides a set of interfaces (e.g., routines and protocols) that can be called or queried by the messaging client 104 in order to invoke functionality of the application servers 112. The Application Program Interface (API) server 110 exposes various functions supported by the application servers 112, including account registration, login functionality, the sending of messages, via the application servers 112, from a particular messaging client 104 to another messaging client 104, the sending of media files (e.g., images or video) from a messaging client 104 to a messaging server 114, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 112 host a number of server applications and subsystems, including for example a messaging server 114, an image processing server 116, and a social network server 122. The messaging server 114 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 114, in view of the hardware requirements for such processing.

The application servers 112 also include an image processing server 116 that is dedicated to performing various image processing operations, typically with respect to images or video within the payload of a message sent from or received at the messaging server 114. Some of the various image processing operations may be performed by various AR components, which can be hosted or supported by the image processing server 116.

Figure 3:
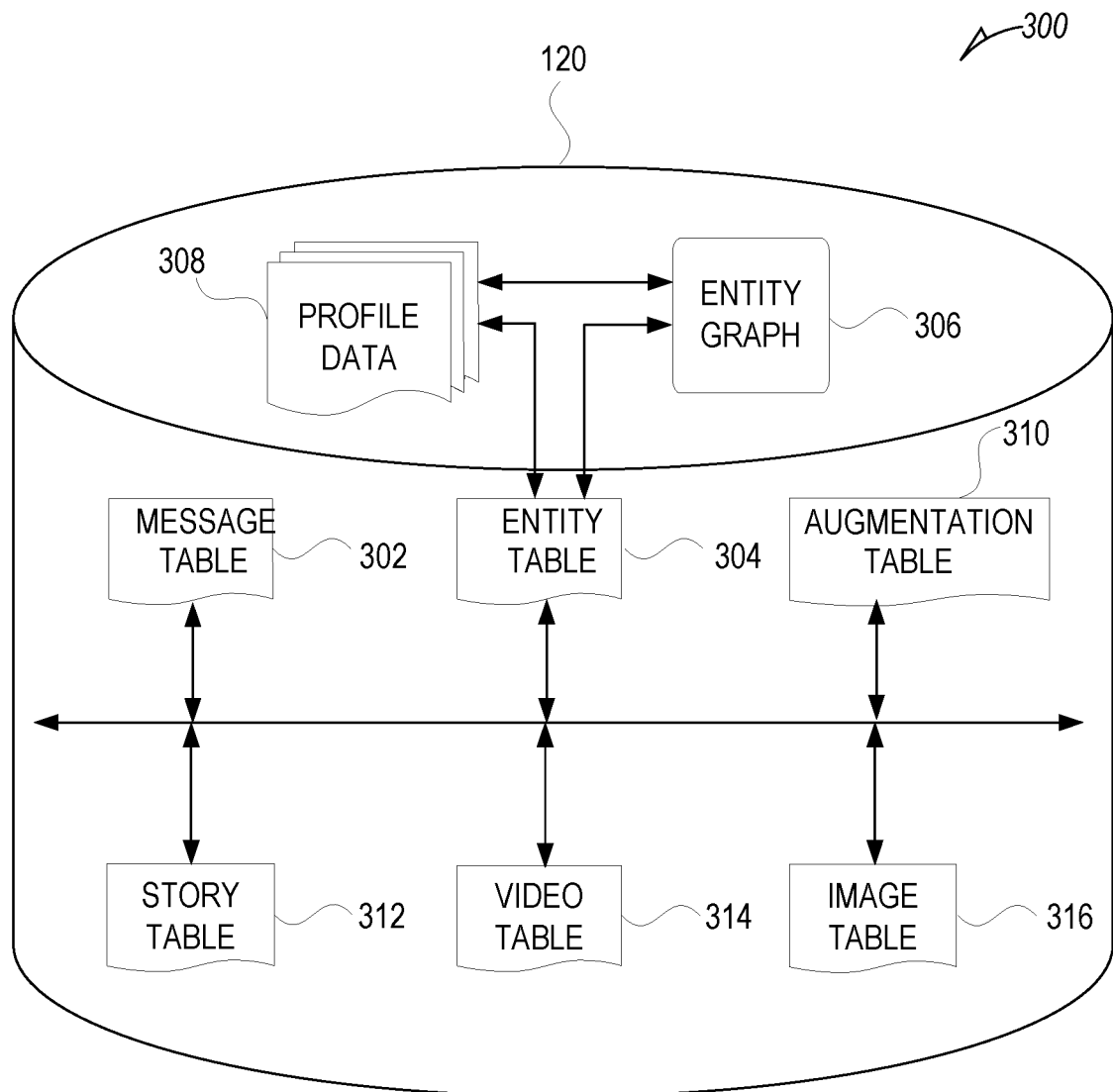
FIG. 3 is a diagrammatic representation of a data structure as maintained in a database, in accordance with some examples.

The social network server 122 supports various social networking functions and services and makes these functions and services available to the messaging server 114. To this end, the social network server 122 maintains and accesses an entity graph 306 (as shown in FIG. 3) within the database 120. Examples of functions and services supported by the social network server 122 include the identification of other users of the messaging system 100 with which a particular user has a "friend" relationship or is "following," and also the identification of other entities and interests of a particular user.

System Architecture

Figure 2:
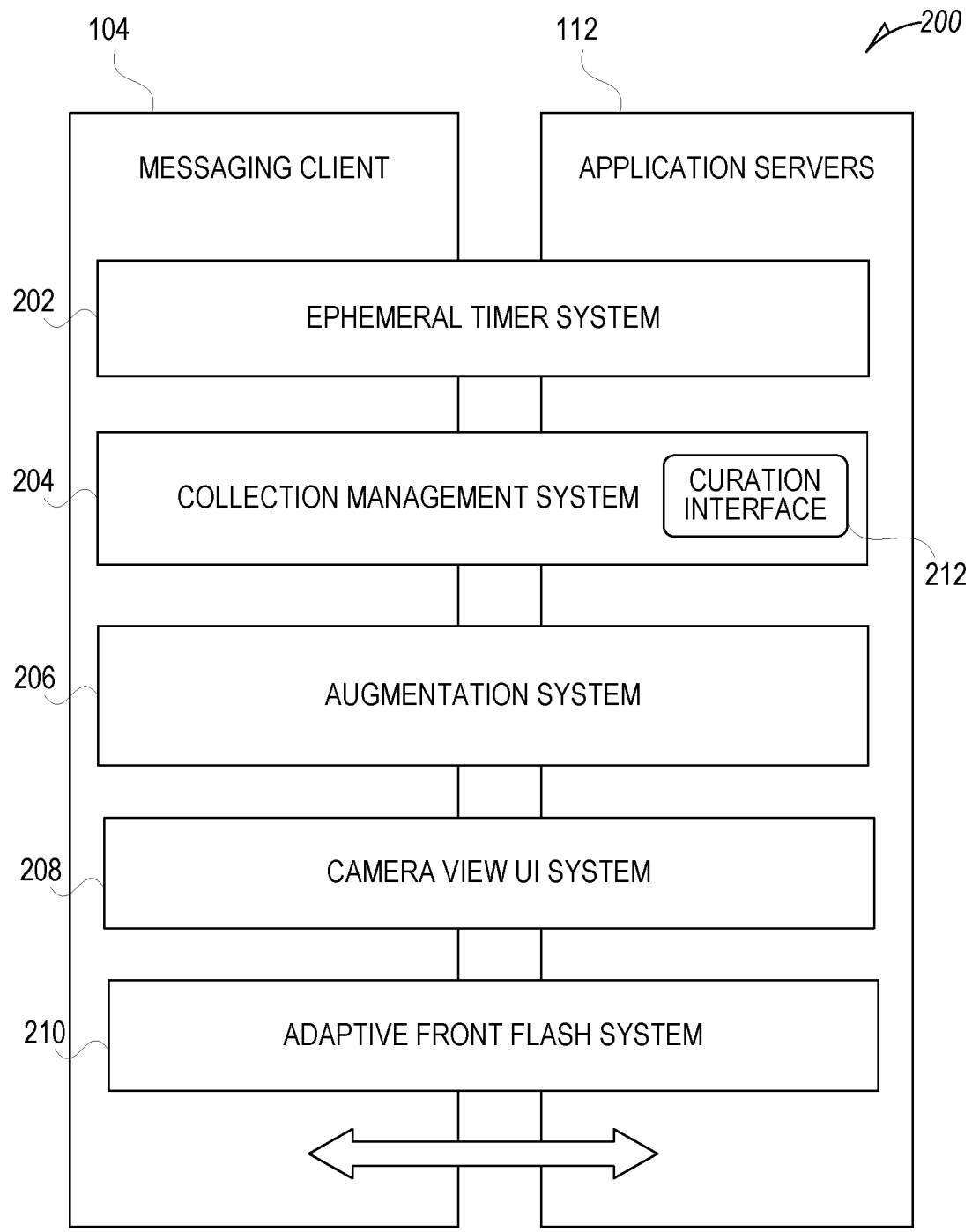
FIG. 2 is a diagrammatic representation of a messaging system, in accordance with some examples, that has both client-side and server-side functionality, and that includes an adaptive front flash system.

FIG. 2 is a block diagram illustrating further details regarding the messaging system 100, according to some examples. Specifically, the messaging system 100 is shown to comprise the messaging client 104 and the application servers 112. The messaging system 100 embodies a number of subsystems, which are supported on the client-side by the messaging client 104, and on the sever-side by the application servers 112. These subsystems include, for example, an ephemeral timer system 202, a collection management system 204, an augmentation system 206, a camera view UI system 208, and an adaptive front flash system 210.

The camera view UI system 208 is configured to cause presentation of a camera view UI, which displays the output of a digital image sensor of a camera provided with an associated client device, as well as user selectable elements that permit users to invoke various functionality related to the operation of the camera. For example, the camera view UI system 208 generates user selectable elements that can be engaged to capture the output of the digital image sensor of a camera as an image, to start and stop a video recording, to switch between a rear camera and a front facing camera, as well as other user selectable elements.

The adaptive front flash system 210, which is included in or cooperates with the camera view UI system 208, is configured to receive or generate an image corresponding to the output of a digital image sensor of a camera provided with an associated client device, determine one or more characteristics of the output of the digital image sensor of the front facing camera, and, based on the derived characteristics, adjust configuration parameters of the front flash view.

The ephemeral timer system 202 is responsible for enforcing the temporary or time-limited access to content by the messaging client 104 and the messaging server 114. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image, video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. In a further example, a collection may include content, which was generated using one or more AR components. The collection management system 204 may also be responsible for publishing an icon that provides notification of the existence of a particular collection to the user interface of the messaging client 104.

The collection management system 204 furthermore includes a curation interface 212 that allows a collection manager to manage and curate a particular collection of content. For example, the curation interface 212 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content, which may be associated with a message. For example, the augmentation system 206 provides functions related to the generation and publishing of media overlays for messages processed by the messaging system 100. The media overlays may be stored in the database 120 and accessed through the database server 118.

In some examples, the augmentation system 206 is configured to provide access to AR components that can be implemented using a programming language suitable for application development, such as, e.g., JavaScript or Java and that are identified in the messaging server system by respective AR component identifiers. An AR component may include or reference various image processing operations corresponding to an image modification, filter, media overlay, transformation, and the like. These image processing operations can provide an interactive experience of a real-world environment, where objects, surfaces, backgrounds, lighting etc., captured by a digital image sensor or a camera, are enhanced by computer-generated perceptual information. In this context an AR component comprises the collection of data, parameters, and other assets needed to apply a selected augmented reality experience to an image or a video feed.

In some embodiments, an AR component includes modules configured to modify or transform image data presented within a graphical user interface (GUI) of a client device in some way. For example, complex additions or transformations to the content images may be performed using AR component data, such as adding rabbit ears to the head of a person in a video clip, adding floating hearts with background coloring to a video clip, altering the proportions of a person's features within a video clip, or many numerous other such transformations. This includes both real-time modifications that modify an image as it is captured using a camera associated with a client device and then displayed on a screen of the client device with the AR component modifications, as well as modifications to stored content, such as video clips in a gallery that may be modified using AR components.

Various augmented reality functionality that may be provided by an AR component include detection of objects (e.g. faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. For example, some embodiments may involve generating a 3D mesh model of the object or objects, and using transformations and animated textures of the model within the video to achieve the transformation. In other embodiments, tracking of points on an object may be used to place an image or texture, which may be two dimensional or three dimensional, at the tracked position. In still further embodiments, neural network analysis of video frames may be used to place images, models, or textures in content (e.g. images or frames of video). AR component data thus refers to both to the images, models, and textures used to create transformations in content, as well as to additional modeling and analysis information needed to achieve such transformations with object detection, tracking, and placement.

Data Architecture

FIG. 3 is a schematic diagram illustrating data structures 300, which may be stored in the database 120 of the messaging server system 108, according to certain examples. While the content of the database 120 is shown to comprise a number of tables, it will be appreciated that the data could be stored in other types of data structures (e.g., as an object-oriented database).

The database 120 includes message data stored within a message table 302. This message data includes, for any particular one message, at least message sender data, message recipient (or receiver) data, and a payload. The payload of a message may include content generated using an adaptive front flash view. Further details regarding information that may be included in a message, and included within the message data stored in the message table 302 is described below with reference to FIG. 4.

An entity table 304 stores entity data, and is linked (e.g., referentially) to an entity graph 306 and profile data 308. Entities for which records are maintained within the entity table 304 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 306 stores information regarding relationships and associations between entities. Such relationships may be social, professional (e.g., work at a common corporation or organization) interested-based or activity-based, merely for example. With reference to the functionality provided by the AR component, the entity graph 306 stores information that can be used, in cases where the AR component is configured to permit using a portrait image of a user other than that of the user controlling the associated client device for modifying the target media content object, to determine a further profile that is connected to the profile representing the user controlling the associated client device. As mentioned above, the portrait image of a user may be stored in a user profile representing the user in the messaging system.

The profile data 308 stores multiple types of profile data about a particular entity. The profile data 308 may be selectively used and presented to other users of the messaging system 100, based on privacy settings specified by a particular entity. Where the entity is an individual, the profile data 308 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

The database 120 also stores augmentation data in an augmentation table 310. The augmentation data is associated with and applied to videos (for which data is stored in a video table 314) and images (for which data is stored in an image table 316). In some examples, the augmentation data is used by various AR components, including the AR component. An example of augmentation data is a target media content object, which may be associated with an AR component and used to generate an AR experience for a user, as described above.

Another example of augmentation data is augmented reality (AR) tools that can be used in AR components to effectuate image transformations. Image transformations include real-time modifications, which modify an image (e.g., a video frame) as it is captured using a digital image sensor of a client device 102. The modified image is displayed on a screen of the client device 102 with the modifications. AR tools may also be used to apply modifications to stored content, such as video clips or still images stored in a gallery. In a client device 102 with access to multiple AR tools, a user can apply different AR tools (e.g., by engaging different AR components configured to utilize different AR tools) to a single video clip to see how the different AR tools would modify the same video clip. For example, multiple AR tools that apply different pseudorandom movement models can be applied to the same captured content by selecting different AR tools for the same captured content. Similarly, real-time video capture may be used with an illustrated modification to show how video images currently being captured by a digital image sensor of a camera provided with a client device 102 would modify the captured data. Such data may simply be displayed on the screen and not stored in memory, or the content captured by digital image sensor may be recorded and stored in memory with or without the modifications (or both). A messaging client 104 can be configured to include a preview feature that can show how modifications produced by different AR tools will look, within different windows in a display at the same time. This can, for example, permit a user to view multiple windows with different pseudorandom animations presented on a display at the same time.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

A story table 312 stores data regarding collections of messages and associated image, video, or audio data, which are compiled into a collection (e.g., a story or a gallery). The creation of a particular collection may be initiated by a particular user (e.g., each user for which a record is maintained in the entity table 304). A user may create a "personal story" in the form of a collection of content that has been created and sent/broadcast by that user. To this end, the user interface of the messaging client 104 may include an icon that is user-selectable to enable a sending user to add specific content to his or her personal story. In some examples, the story table 312 stores one or more images or videos that were created using an adaptive front flash view.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 314 stores video data that, in some examples, is associated with messages for which records are maintained within the message table 302. Similarly, the image table 316 stores image data associated with messages for which message data is stored in the entity table 304. The entity table 304 may associate various augmentations from the augmentation table 310 with various images and videos stored in the image table 316 and the video table 314.

Data Communications Architecture

Figure 4:
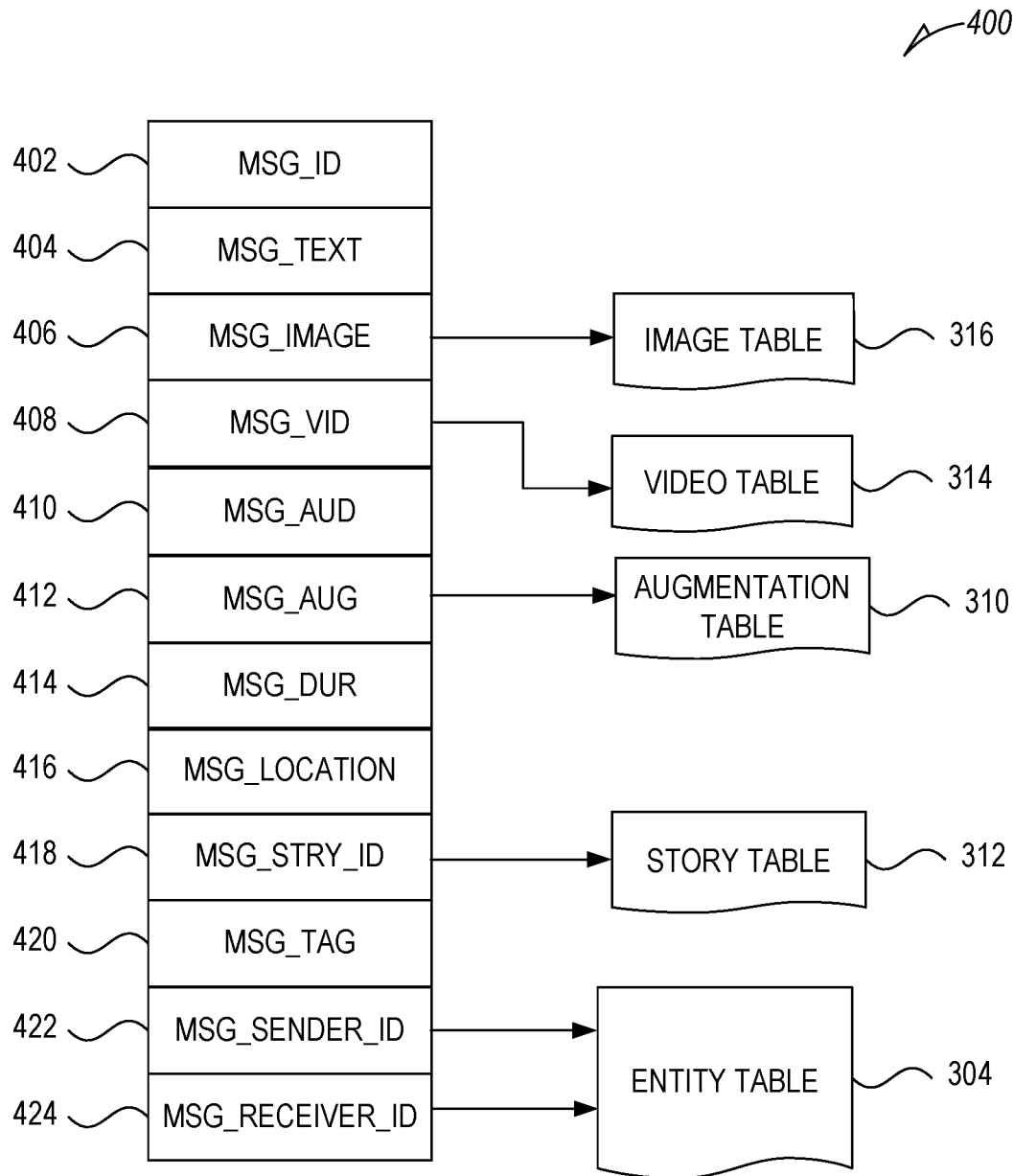
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 114. The content of a particular message 400 is used to populate the message table 302 stored within the database 120, accessible by the messaging server 114. Similarly, the content of a message 400 is stored in memory as "in-transit" or "in-flight" data of the client device 102 or the application servers 112. The content of a message 400, in some examples, includes an image or a video that was created using the AR component. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 316. The image data may include content generated using an adaptive front flash view.

message video payload 408: video data, captured by a camera component or retrieved from a memory component of the client device 102, and that is included in the message 400. Video data for a sent or received message 400 may be stored in the video table 314. The video data may include content generated using an adaptive front flash view.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 304.

Time-Based Access Limitation Architecture

Figure 5:
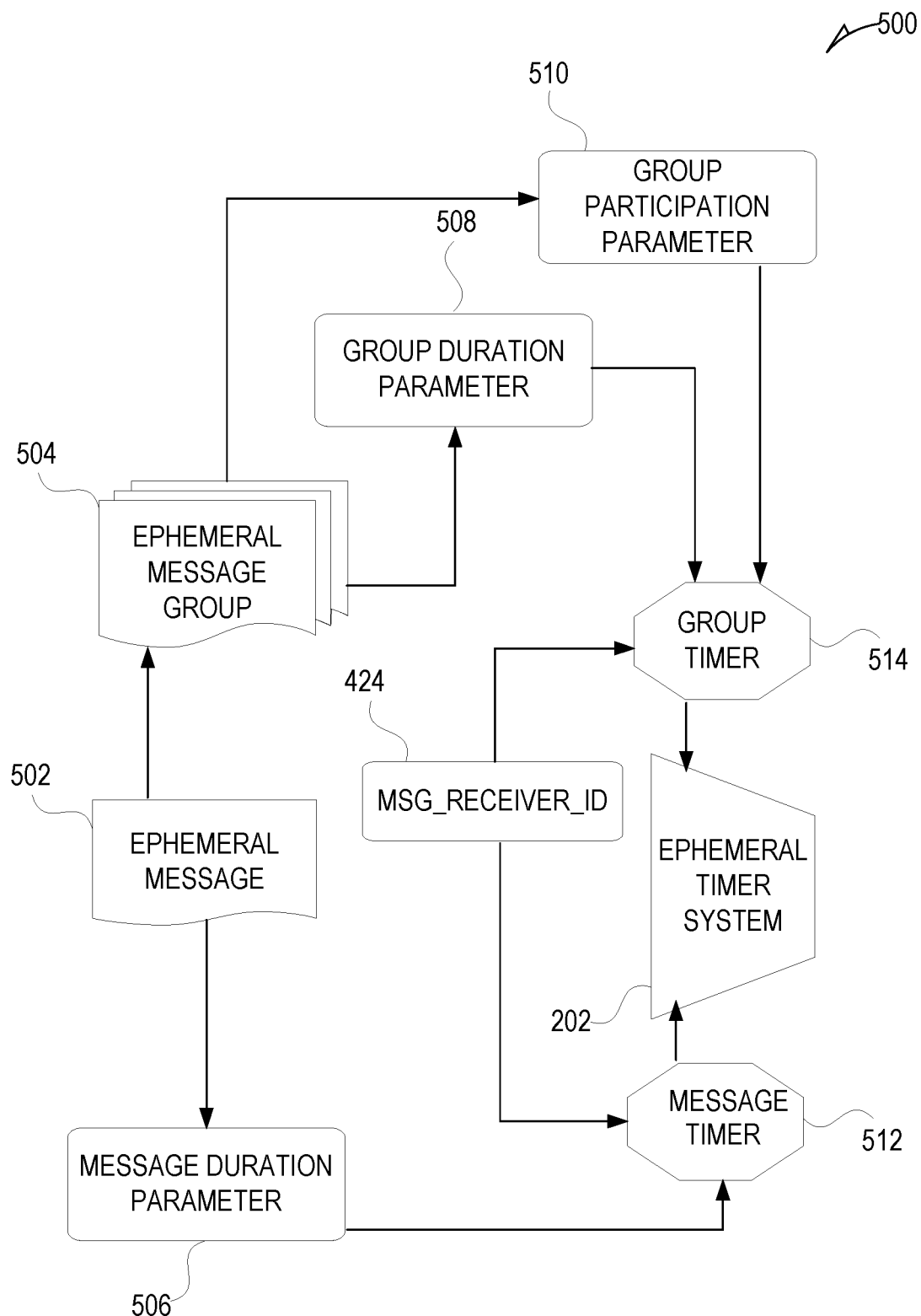
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral). The content of an ephemeral message 502, in some examples, includes an image or a video that was created using an adaptive front flash view.

An ephemeral message 502 is shown to be associated with a message duration parameter 506, the value of which determines an amount of time that the ephemeral message 502 will be displayed to a receiving user of the ephemeral message 502 by the messaging client 104. In some examples, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 510, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 510, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In some examples, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 510. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 510. For example, when a sending user has established a group participation parameter 510 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 510 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 510 for the last remaining ephemeral message 502 within the ephemeral message group 504 will determine when the ephemeral message group 504 itself expires. In this case, a new ephemeral message 502, added to the ephemeral message group 504, with a new group participation parameter 510, effectively extends the life of an ephemeral message group 504 to equal the value of the group participation parameter 510.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Process Flow and User Interfaces

Figure 6:
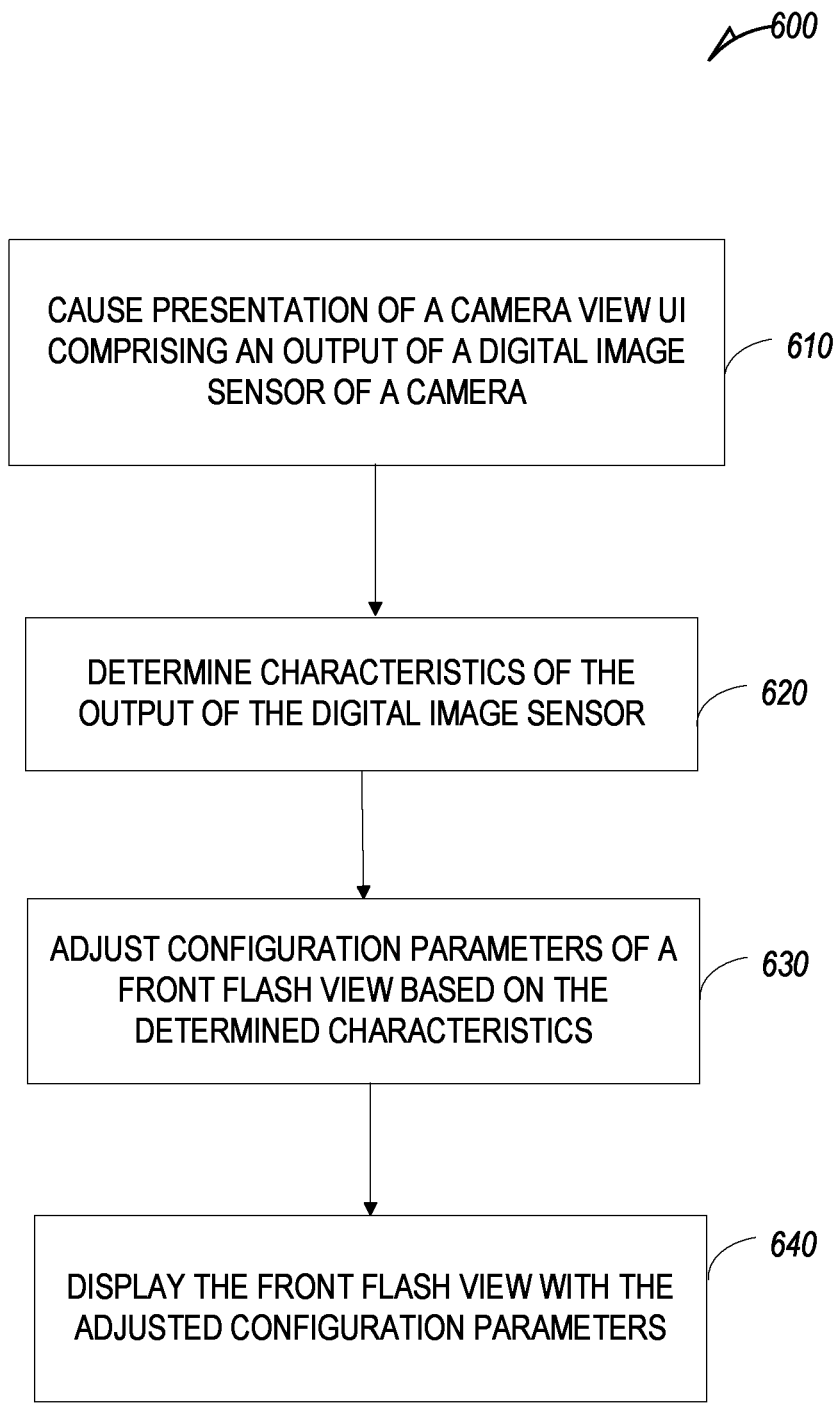
FIG. 6 is a flowchart of a method for enhancing users' experience of utilizing a camera of a client device, in accordance with some examples.

FIG. 6 is a flowchart of a method 600 for enhancing users' experience of utilizing a camera of a client device, in accordance with some examples. The method 600 may be performed by processing logic that may comprise hardware (e.g., dedicated logic, programmable logic, microcode, etc.), software, or a combination of both. In some examples, the processing logic resides at the messaging client 104 and/or the application servers 112 of FIG. 1.

Although the described flowchart can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems. The method 600 commences with operation 610.

At operation 610, the camera view UI system 208 of FIG. 2 causes presentation of a camera view UI on a display device. As explained above, the camera view UI comprises an output of a digital image sensor of a camera and a user selectable element actionable to capture the output of the digital image sensor of the camera. At operation 620, the adaptive front flash system 210 of FIG. 2, which is included in or cooperates with the camera view UI system 208, determines characteristics of the output of the digital image sensor of the front facing camera. At operation 630, the adaptive front flash system 210 adjusts configuration parameters of a front flash view based on the determined characteristics. At operation 640, the camera view UI system 208 causes display of the front flash view with the selected configuration parameters on the display of the client device, in the camera view UI.

Examples of the configuration parameters are the brightness of the display, the color temperature of the front flash view, and the transparency of the front flash view. Examples of the characteristics of the output of the digital image sensor of the front facing camera include the histogram of the image corresponding to the output of the digital image sensor of the front facing camera. When the adaptive front flash system 210 determines that the histogram indicates underexposure, the adaptive front flash system 210 adjusts the configuration parameters of the front flash view by increasing the brightness of the display and/or decreasing the transparency of the front flash view. As explained above, examples of a front flash view are a blanket front flash view and a ring flash view. A front flash view is displayed as an overlay in the camera view UI when the user selectable element actionable to capture the output of the digital image sensor of the camera is activated. A ring flash view is a view included along a perimeter of the camera view UI.

In some examples, a method for enhancing users' experience of utilizing a camera of a client device includes obtaining permission from a user to perform face detection, detecting a face in an image corresponding to the output of the digital image sensor, and adjusting the configuration parameters of the front flash view based on characteristics a portion of the image that represents the face.

As explained above, in some examples the camera view UI is provided by a messaging system that provides a messaging client executing at the client device, the method comprising communicating where the image captured while the front flash view is displayed with the adjusted configuration parameters as an overlay in the camera view UI is communicated to another client device. The messaging client causes capturing of an image while the front flash view is displayed with the adjusted configuration parameters as an overlay in the camera view UI in response to the detecting activation of the user selectable element actionable to capture the output of the digital image sensor of the camera.

FIG. 7 illustrates a camera view UI 700 that includes the adaptive front flash view. The camera view UI 700 is shown with the adaptive front flash view activated, and the output of the digital image sensor of the camera is overlaid by a front flash view, which is shown in area 710 with a diagonal lines pattern.

FIG. 8 illustrates a camera view UI 800, in which the adaptive front flash view has greater transparency, in which case the output of the digital image sensor of the camera is more visible in area 810, as compared to a face shown in the are 710 of FIG. 7.

As explained above, color temperature is a way to describe the light appearance provided by a light source, cool colors being more bluish, while warm colors being more yellowish. FIG. 9, illustrates a camera view UI 900, in which the adaptive front flash view is shown in area 910 with a crossing diagonal lines pattern to indicate a different color warmth of the front flash view as compared to the color warmth of the front flash view shown in FIG. 7 and FIG. 8.

FIG. 10 illustrates a camera view UI 1000 that includes a ring flash view depicted as area 1010 along a perimeter of area along a perimeter of area 1020. The camera view UI 1000 also displays a user selectable element 1030, which is actionable to capture the output of the digital image sensor of the camera.

Figure 11:
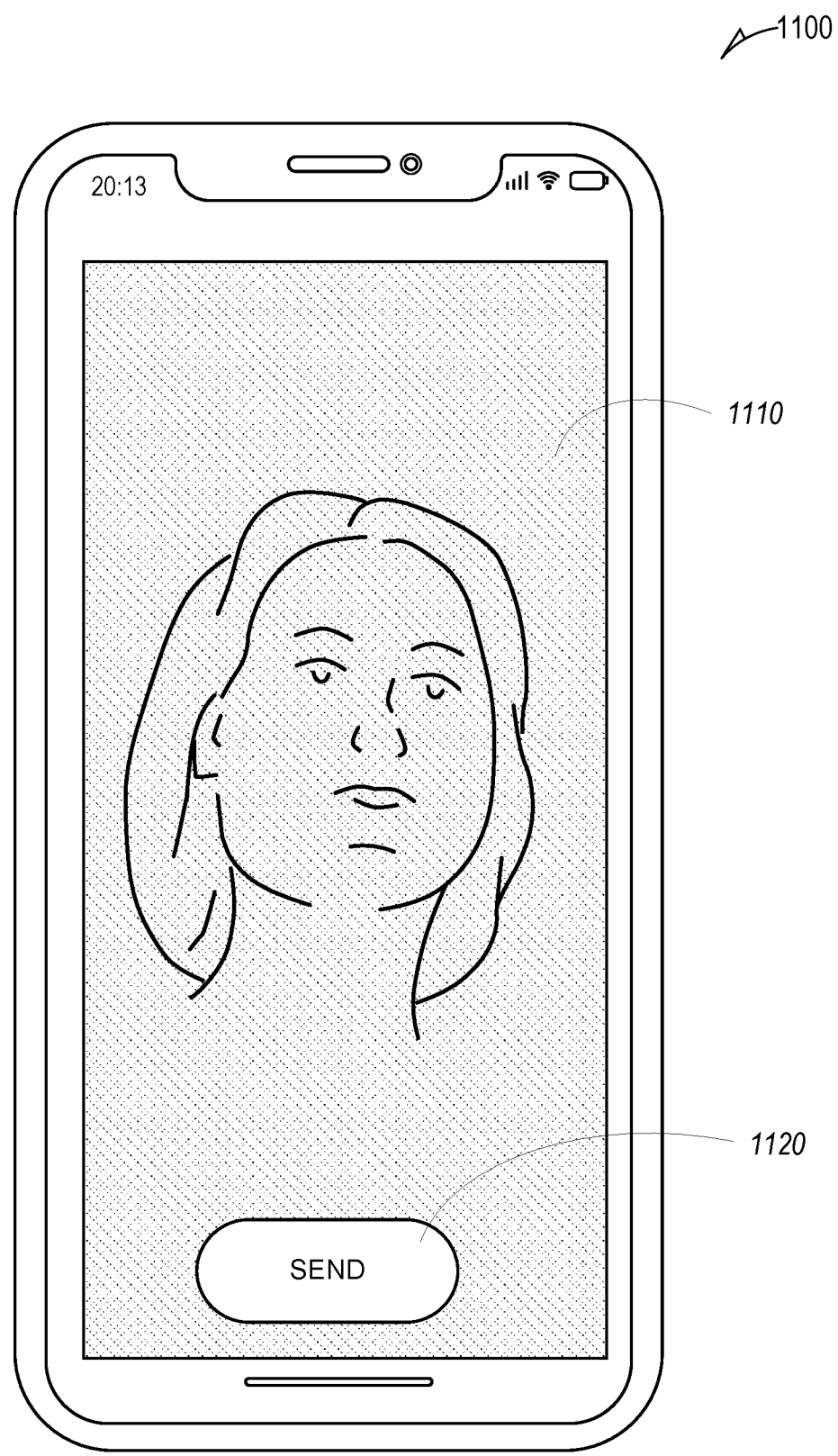
FIG. 11 illustrates an image captured using an adaptive front flash view, in accordance with some examples.

FIG. 11 illustrates a view 1100 that includes, in area 1110, an image captured using an adaptive front flash view. As mentioned above, the camera view UI may be provided by a messaging system that provides a messaging client. An image, shown in the area 1110, which was captured while the camera view UI displayed the adaptive front flash view, may be communicated to another client device using a user selectable element 1120.

Machine Architecture

Figure 12:
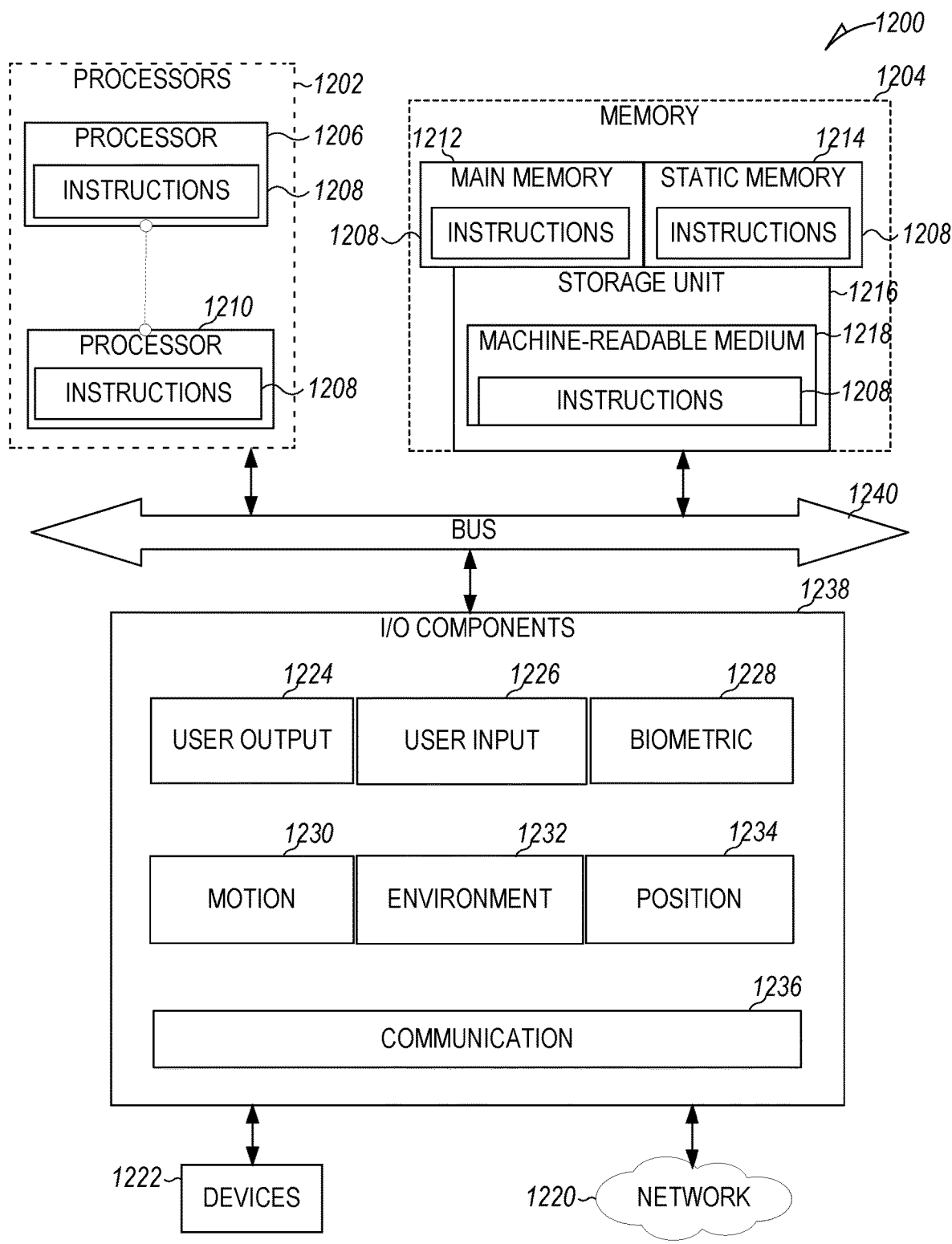
FIG. 12 is a diagrammatic representation of a machine in the form of a computer system within which a set of instructions may be executed for causing the machine to perform any one or more of the methodologies discussed herein, in accordance with some examples.

FIG. 12 is a diagrammatic representation of the machine 1200 within which instructions 1208 (e.g., software, a program, an application, an applet, an app, or other executable code) for causing the machine 1200 to perform any one or more of the methodologies discussed herein may be executed. For example, the instructions 1208 may cause the machine 1200 to execute any one or more of the methods described herein. The instructions 1208 transform the general, non-programmed machine 1200 into a particular machine 1200 programmed to carry out the described and illustrated functions in the manner described. The machine 1200 may operate as a standalone device or may be coupled (e.g., networked) to other machines. In a networked deployment, the machine 1200 may operate in the capacity of a server machine or a client machine in a server-client network environment, or as a peer machine in a peer-to-peer (or distributed) network environment. The machine 1200 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1208, sequentially or otherwise, that specify actions to be taken by the machine 1200. Further, while only a single machine 1200 is illustrated, the term "machine" shall also be taken to include a collection of machines that individually or jointly execute the instructions 1208 to perform any one or more of the methodologies discussed herein. The machine 1200, for example, may comprise the client device 102 or any one of a number of server devices forming part of the messaging server system 108. In some examples, the machine 1200 may also comprise both client and server systems, with certain operations of a particular method or algorithm being performed on the server-side and with certain operations of the particular method or algorithm being performed on the client-side.

The machine 1200 may include processors 1202, memory 1204, and input/output I/O components 1238, which may be configured to communicate with each other via a bus 1240. In an example, the processors 1202 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1206 and a processor 1210 that execute the instructions 1208. The term "processor" is intended to include multi-core processors that may comprise two or more independent processors (sometimes referred to as "cores") that may execute instructions contemporaneously. Although FIG. 12 shows multiple processors 1202, the machine 1200 may include a single processor with a single-core, a single processor with multiple cores (e.g., a multi-core processor), multiple processors with a single core, multiple processors with multiples cores, or any combination thereof.

The memory 1204 includes a main memory 1212, a static memory 1214, and a storage unit 1216, both accessible to the processors 1202 via the bus 1240. The main memory 1204, the static memory 1214, and storage unit 1216 store the instructions 1208 embodying any one or more of the methodologies or functions described herein. The instructions 1208 may also reside, completely or partially, within the main memory 1212, within the static memory 1214, within machine-readable medium 1218 within the storage unit 1216, within at least one of the processors 1202 (e.g., within the Processor's cache memory), or any suitable combination thereof, during execution thereof by the machine 1200.

The I/O components 1238 may include a wide variety of components to receive input, provide output, produce output, transmit information, exchange information, capture measurements, and so on. The specific I/O components 1238 that are included in a particular machine will depend on the type of machine. For example, portable machines such as mobile phones may include a touch input device or other such input mechanisms, while a headless server machine will likely not include such a touch input device. It will be appreciated that the I/O components 1238 may include many other components that are not shown in FIG. 12. In various examples, the I/O components 1238 may include user output components 1224 and user input components 1226. The user output components 1224 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1226 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1238 may include biometric components 1228, motion components 1230, environmental components 1232, or position components 1234, among a wide array of other components. For example, the biometric components 1228 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1230 include acceleration sensor components (e.g., accelerometer), gravitation sensor components, rotation sensor components (e.g., gyroscope).

The environmental components 1232 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1234 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1238 further include communication components 1236 operable to couple the machine 1200 to a network 1220 or devices 1222 via respective coupling or connections. For example, the communication components 1236 may include a network interface Component or another suitable device to interface with the network 1220. In further examples, the communication components 1236 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1222 may be another machine or any of a wide variety of peripheral devices (e.g., a peripheral device coupled via a USB).

Moreover, the communication components 636 may detect identifiers or include components operable to detect identifiers. For example, the communication components 636 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1236, such as location via Internet Protocol (IP) geolocation, location via Wi-Fi® signal triangulation, location via detecting an NFC beacon signal that may indicate a particular location, and so forth.

The various memories (e.g., main memory 1212, static memory 1214, and memory of the processors 1202) and storage unit 1216 may store one or more sets of instructions and data structures (e.g., software) embodying or used by any one or more of the methodologies or functions described herein. These instructions (e.g., the instructions 1208), when executed by processors 1202, cause various operations to implement the disclosed examples.

The instructions 1208 may be transmitted or received over the network 1220, using a transmission medium, via a network interface device (e.g., a network interface component included in the communication components 1236) and using any one of several well-known transfer protocols (e.g., hypertext transfer protocol (HTTP)). Similarly, the instructions 608 may be transmitted or received using a transmission medium via a coupling (e.g., a peer-to-peer coupling) to the devices 1222.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1202 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method comprising:
causing presentation of a camera view user interface (UI) on a display of a computing device, the camera view UI comprising an output of a digital image sensor of a camera,
determining characteristics of the output of the digital image sensor of the camera;
adjusting a transparency of a flash view based on the determined characteristics; and
on the display of the computing device, causing display of the flash view overlaid over the camera view UI, the flash view displayed with selected configuration parameters to adjust a brightness level of the output of the digital image sensor that is presented in the camera view UI.

2. The method of claim 1, wherein the configuration parameters of the flash view include one or more of brightness of the display, color temperature of the flash view, and the transparency of the flash view.

3. The method of claim 2, wherein the determined characteristics include a histogram of an image corresponding to the output of the digital image sensor of the camera, the method comprising:
determining that the histogram of the image corresponding to the output of the digital image sensor of the camera indicates underexposure, wherein adjusting the transparency of the flash view comprises decreasing the transparency of the flash view to cause an increase to the brightness level of the output of the digital image sensor that is presented in the camera view UI.

4. The method of claim 2, further comprising:
detecting a face in an image corresponding to the output of the digital image sensor; and
adjusting the color temperature of the flash view based on detecting characteristics of a portion of the image that represents the face, the characteristics comprising a color tone of the portion of the image that represents the face.

5. The method of claim 4, wherein the color tone of the portion of the image that represents the face is a blue color tone, and the adjusting of the color temperature of the flash view comprises increasing the color temperature of the flash view.

6. The method of claim 1, further comprising:
detecting a face in an image corresponding to the output of the digital image sensor; and
adjusting the transparency of the flash view based on characteristics of a portion of the image that represents the face.

7. The method of claim 6, further comprising obtaining permission from a user to perform face detection, prior to the detecting of the face in the image corresponding to the output of the digital image sensor.

8. The method of claim 1, wherein:
the camera view UI comprises a user selectable element actionable to capture the output of the digital image sensor of the camera;
the flash view is a blanket flash view, the blanket flash view being displayed as an overlay in the camera view UI when user selectable element actionable to capture the output of the digital image sensor of the camera is activated; and
the method further comprises:
detecting activation of the user selectable element actionable to capture the output of the digital image sensor of the camera; and
in response to the detecting, displaying the blanket flash view as an overlay in the camera view UI.

9. The method of claim 1, wherein the camera view UI comprises an user selectable element actionable to capture the output of the digital image sensor of the camera, the method further comprising:
detecting activation of the user selectable element actionable to capture the output of the digital image sensor of the camera; and
in response to the detecting activation of the user selectable element actionable to capture the output of the digital image sensor of the camera, causing capturing of an image while the flash view is displayed as an overlay in the camera view UI.

10. The method of claim 9, wherein the camera view UI is provided by a messaging system that provides a messaging client executing at the computing device, the method further comprising communicating to another computing device the image captured while the flash view is displayed as an overlay in the camera view UI.

11. A computing device comprising:
one or more computer processors; and
one or more computer-readable mediums storing instructions that, when executed by the one or more computer processors, cause the computing device to perform operations comprising:
causing presentation of a camera view user interface (UI) on a display of a computing device, the camera view UI comprising an output of a digital image sensor of a camera,
determining characteristics of the output of the digital image sensor of the camera;
adjusting a transparency of a flash view based on the determined characteristics; and
on the display of the computing device, causing display of the flash view overlaid over the camera view UI, the flash view displayed with selected configuration parameters to adjust a brightness level of the output of the digital image sensor that is presented in the camera view UI.

12. The computing device of claim 11, wherein the configuration parameters of the flash view include one or more of brightness of the display, color temperature of the flash view, and the transparency of the flash view.

13. The computing device of claim 12, wherein the determined characteristics include a histogram of an image corresponding to the output of the digital image sensor of the camera, the operations comprising:
determining that the histogram of the image corresponding to the output of the digital image sensor of the camera indicates underexposure, wherein adjusting the transparency of the flash view comprises decreasing the transparency of the flash view to cause an increase to the brightness level of the output of the digital image sensor that is presented in the camera view UI.

14. The computing device of claim 12, the operations further comprising:
detecting a face in an image corresponding to the output of the digital image sensor; and
adjusting the color temperature of the flash view based on detecting characteristics of a portion of the image that represents the face, the characteristics comprising a color tone of the portion of the image that represents the face.

15. The computing device of claim 14, wherein the color tone of the portion of the image that represents the face is a blue color tone, and the adjusting of the color temperature of the flash view comprises increasing the color temperature of the flash view.

16. The computing device of claim 11, the operations further comprising:
detecting a face in an image corresponding to the output of the digital image sensor; and
adjusting the transparency of the flash view based on characteristics of a portion of the image that represents the face.

17. The computing device of claim 16, the operations further comprising obtaining permission from a user to perform face detection, prior to the detecting of the face in the image corresponding to the output of the digital image sensor.

18. The computing device of claim 11, wherein:
the camera view UI comprises a user selectable element actionable to capture the output of the digital image sensor of the camera;
the flash view is a blanket flash view, the blanket flash view being displayed as an overlay in the camera view UI when user selectable element actionable to capture the output of the digital image sensor of the camera is activated; and the operations further comprise:
detecting activation of the user selectable element actionable to capture the output of the digital image sensor of the camera; and
in response to the detecting, displaying the blanket flash view as an overlay in the camera view UI.

19. A non-transitory computer-readable medium storing instructions that, when executed by one or more computer processors of a client device, cause the client device to perform operations comprising:
causing presentation of a camera view user interface (UI) on a display of a computing device, the camera view UI comprising an output of a digital image sensor of a camera,
determining characteristics of the output of the digital image sensor of the camera;
adjusting a transparency of a flash view based on the determined characteristics; and
on the display of the computing device, causing display of the flash view overlaid over the camera view UI, the flash view displayed with selected configuration parameters to adjust a brightness level of the output of the digital image sensor that is presented in the camera view UI.

20. The non-transitory computer-readable medium of claim 19, wherein the configuration parameters of the flash view include one or more of brightness of the display, color temperature of the flash view, and the transparency of the flash view.

* * * * *